Jan. 21, 1964    F. J. BERNARD    3,118,694
COUPLING DEVICES FOR JOINING TUBULAR
MEMBERS TO STRUCTURAL ELEMENTS
Filed Nov. 2, 1961    2 Sheets-Sheet 1
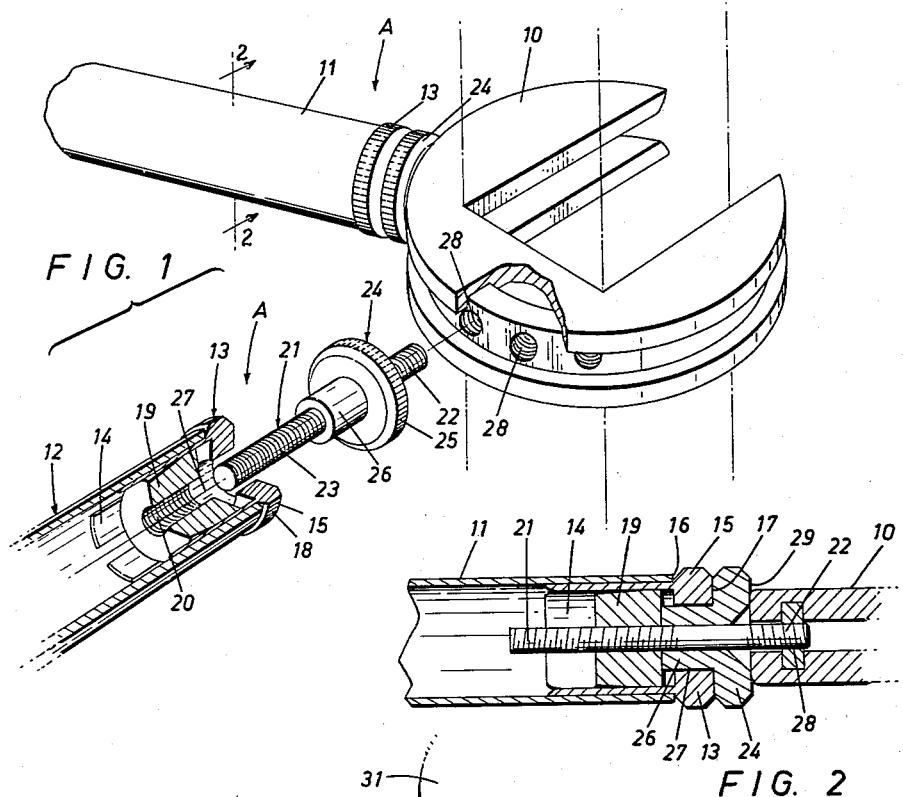
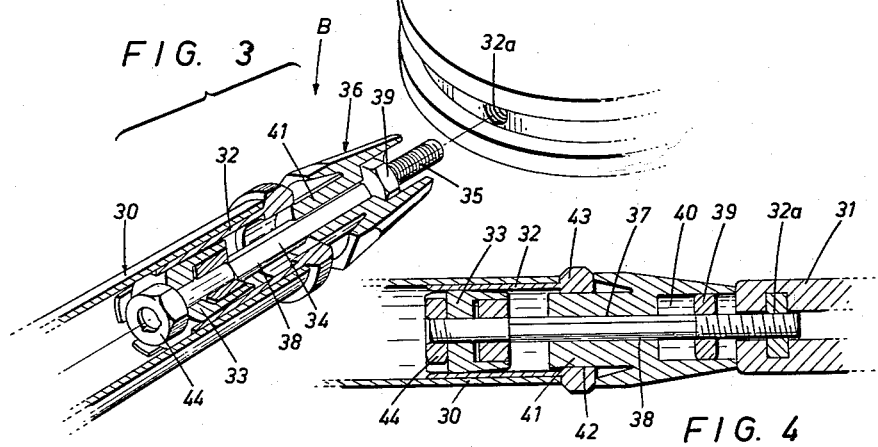
INVENTOR.
FRANK J. BERNARD
Attorney

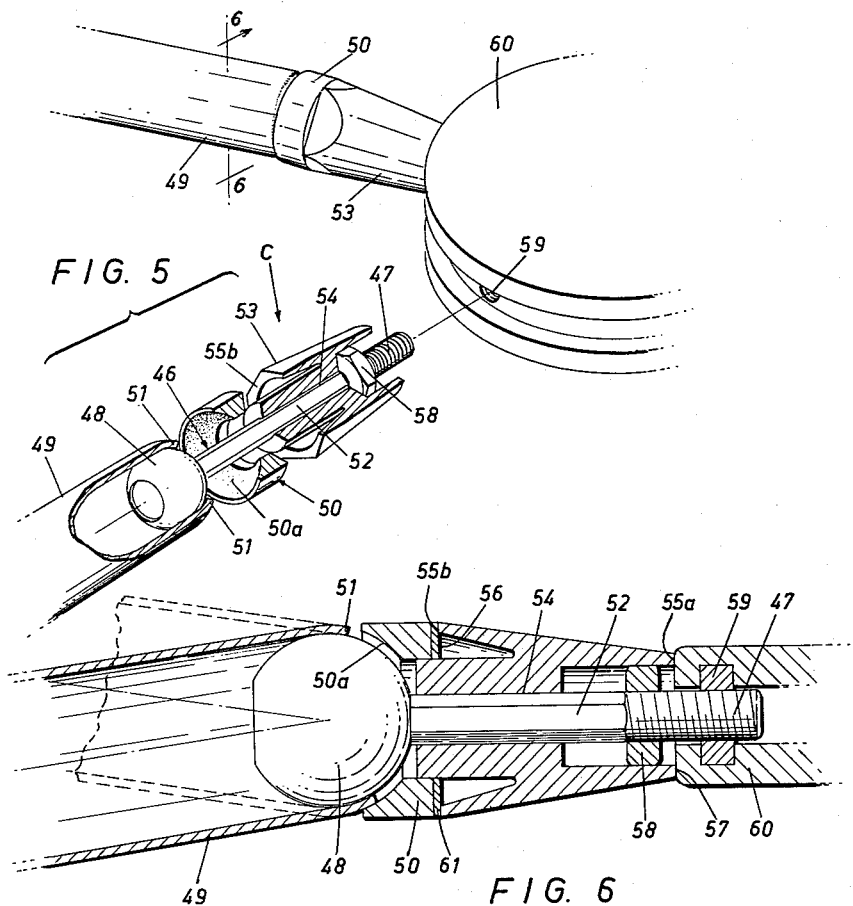

United States Patent Office 3,118,694
Patented Jan. 21, 1964

3,118,694
COUPLING DEVICES FOR JOINING TUBULAR
MEMBERS TO STRUCTURAL ELEMENTS
Frank Jaroslav Bernard, 200 Geary Ave.,
Toronto, Ontario 4, Canada
Filed Nov. 2, 1961, Ser. No. 149,555
6 Claims. (Cl. 287—2)

This invention relates to improvements in coupling devices for joining tubular structural members to connectors, posts or other structural elements in the erection of support structures generally.

The principal object of this invention is to provide a coupling device for joining tubular members to other pieces of a structural assembly in a secure manner and more particularly to provide a releasable coupling device for the aforesaid purpose such that removal or adjustment of the tubular member in relation to the other components in the structure can be achieved without disturbing the position of the other components.

Another important object is to provide a coupling device as aforesaid which will permit limited relative movement of the tubular member to an adjacent structural component to which it is connected, or vice versa, where desired, without disturbing the connection.

Another very important object is to provide a coupling device for tubes which in large part is concealed or unobvious so that the overall appearance of the structure is enhanced.

Another object is to provide a coupling device which operates on a relatively simple principle contributing both to the economy of manufacture and the facility with which the device can be used.

More particularly, one feature of this invention resides in employing a sleeve formation as the second tube end gripping means, the sleeve formation having a split sleeve portion insertable into the tube end of a selected tubular element and an integral ring-like base portion adapted to abut the tube end, the first tube end gripping means comprising a tapered nut-like element which is carried by the post element and inserted within the split sleeve, the tapered nut-like element upon being displaced toward the base portion of the sleeve formation, being adapted to expand the split sleeve into tight engagement with the tube wall.

In this arrangement, the sleeve formation can be held against movement tended to be imparted by the tapered nut-like element by grasping the exposed base portion thereof. This embodiment is important where a tube to be connected is fixed in relation to other structural members and it is essential that such connection not be disturbed.

Still another feature resides in employing an axially extending post which is oppositely threaded at each end, the nut-like element threadably engaging with one threaded end of the post in such a manner that upon rotation imparted to the post by the bearing operator element, the nut-like element is displaced in the direction to expand the split sleeve against the wall of the tube while the other threaded end is engaged in a tapped hole presented by a selected structural element.

Still another feature of the invention resides in providing a tube end engaging means in the form of a member having a part spherical configuration which is insertable within the tube end, the second tube end engaging means comprising a collar adapted to abut the tube end and to constrain the tube end inwardly to present a part spherical seat formation to the part spherical surface of the aforementioned member, which arrangement allows limited swinging movement of the tube relative to the aforementioned element and collar.

These and other objects and features are described in the following specification to be read in conjunction with the sheets of drawings in which:

FIGURE 1 is a perspective view of a connector having a first selected tubular member joined thereto by a coupling device constructed in accordance with the invention and a second tubular member with a like coupling device in partly assembled relation and about to be joined to the connector, the second tubular member being broken away to reveal the components of the device normally concealed from view, in tube end engaging relation;

FIGURE 2 is a vertical midsectional view of the first tubular member and coupling device of FIGURE 1 taken along the lines 2—2 of FIGURE 1;

FIGURE 3 is a perspective view illustrating an alternative embodiment of coupling device with a selected tubular member, the tubular member being broken away to reveal the components of the coupling device in tube end engaging relation and in a position to be joined to a connector;

FIGURE 4 is a vertical midsectional view of the coupling of FIGURE 3 with the tubular member joined to the connector;

FIGURE 5 is a view similar to FIGURE 1, but illustrating an alternative embodiment of coupling device with selected tubular members which permits relative movement of the tubular member and the structural element to which it is connected, or vice versa; and FIGURE 6 is a vertical midsectional view of the embodiment of FIGURE 5 taken along the lines 6—6 of FIGURE 5.

In FIGURE 1 there is shown a connector 10 to which one selected tubular member 11 is joined and a second selected tubular member 12 which is to be joined to the connector 10.

In both cases the tubes 11 and 12 employ a coupling device indicated at A of like construction.

With reference to FIGURES 1 and 2, the latter figure being a vertical midsectional view along the lines 2—2 of FIGURE 1, the coupling device A comprises a sleeve formation 13 including a split sleeve portion 14 mounted on generally annular base portion 15, the base portion 15 having a shoulder formation 16 which is adapted to abut against the end edge of tube 11, its opposed face 17 constituting a bearing surface formation.

The annular base 15 is provided with a knurled circumferentially extending surface 18 which is adapted to be gripped to hold the sleeve formation 13 stationary while the coupling device A is being actuated to join the tube 12 to the connector 10.

Located within the split sleeve portion 14 of the sleeve formation 13 is a nut-like element 19 of generally truncated conical configuration, the nut-like element 19 having a tapped bore 20.

A rotatable post formation 21 is arranged to extend axially of the sleeve formation 13, the post formation 21 being threaded inwardly from the outer end as at 22 and inwardly from the opposite end 23, the thread formations 22 and 23 being of opposite hand.

The thread formation 23 is adapted to threadably engage the nut-like element 19 and to displace same under rotation of the post 21.

The rotatable post 21 carries a fixed bearing operator elment 24 centrally, which is knurled circumferentially as at 25 to facilitate gripping, the bearing operator element 24 having a tubular extension 26 which is adapted to telescopically engage in the central circular opening 27 of the base portion 15 of the sleeve formation 13 in the manner indicated in FIGURE 2 which has the effect of laterally bracing the connection.

The connector 10 presents a plurality of tapped holes 28 to the surface thereof, the end of post 21 having thread formation 22 thereon being adapted to threadably engage in one of the tapped holes to secure the post thereto.

It is to be observed from FIGURE 2 that the axial extent of the thread formations 22, 23 and the axial extent of the components of the coupling device A are of the order to ensure that the tube end is tightly clamped and the thread formation 22 fully inserted in the tapped opening 28, with the bearing operator element 24 bearing between the surface 29 of the connector 10 and the bearing surface 17 of the base portion 15 of sleeve formation 13.

It is to be appreciated that by providing the sleeve formation 13 with a tube end engaging base 15 that the extent of the insertion of the split sleeve portion 14 is limited and as well the tendency for the nut-like element 19 to impart rotation to the sleeve 14 upon expanding same may be obviated by gripping the peripheral knurled surface 18 of the base portion and the tube end preventing them from rotating.

The components of coupling A are preferably joined together prior to the insertion of the sleeve formation 13 and associated nut-like element 19 within the end of a tube.

Upon registering the base portion 15 against the tube end it may require a slight shifting of the relative positions of the bearing operator element 24 and nut-like element 19 to achieve the final position indicated in FIGURE 2; that is upon rotation being imparted to the post formation 21 and threading the post into the tapped hole 28 and displacement of the nut-like element 19 axially of the post 21, the bearing operator element 24 should assume a final position bearing against the surface 17 of the base portion 15 and the surface of the connector.

A second embodiment of the coupling device is indicated at B in FIGURE 3 within a tubular member 30 and in position to couple the tubular member 30 to a connector 31, the connector presenting a tapped hole 32a to the surface thereof.

The coupling B comprises a sleeve formation 32 substantially identical to the sleeve formation of embodiment A, a nut-like element 33, a rotatable post formation 34 having a thread formation 35 extending inwardly from the outer end thereof and threadably engageable in the tapped hole 32a of the connector 31 and a bearing operator element 36 for rotating same.

In embodiment B the bearing operator element 36 is adapted to be shiftable axially of the rotatable post 34 and consequently is provided with a central bore 37 of non-circular configuration in cross section. The rotatable post 34 is provided throughout the portion of its extent in the region of the bearing operator element 36 with a corresponding configuration in cross section as indicated at 38, to slidably register with the bore 37 and thereby to accommodate shifting of the bearing operator element 36 and as well to transmit rotational movement from the bearing operator element to the post.

The post 34 is provided with a fixed nut or stop 39 to limit shifting movement of the bearing operator element 36 and is adapted to seat in the end recess 40 thereof concealed from view.

The bearing operator element 36 is also provided with a tubular extension 41 which telescopically engages within the central opening 42 of the base 43 of sleeve formation 32 to give lateral stability to the coupled tube 30 and connector 31.

In embodiment B the nut-like element 33 is constrained by a fixed nut formation 44 or other suitable means for displacement with the post 34 axially when it is threaded into the tapped hole 32a of connector 31. It is to be understood that with the shiftable bearing operator element 36 the nut-like element 33 need not be in threaded engagement with the post 34, the displacement necessary to accomplish clamping of the tube end and positioning of the bearing operator element resulting from the threading of the post 34 into the tapped opening 32 only. It will be appreciated, of course, that in this embodiment the shifting of the bearing operator element enables the components to assume the final position indicated in FIGURE 4 wherein the bearing operator element bears between the surfaces of the base portion 43 of the sleeve formation 32 and the connector 31.

Also it is to be appreciated that the sleeve formation can be held against rotation tended to be imparted to it by the rotation of the bearing operator element upon the threading of the post into the tapped opening so that there will be no movement imparted to the tube 43a.

The embodiment of the coupling indicated at C in FIGURE 5 comprises a rotatable post formation 46 having a thread formation 47 extending inwardly from the outer end thereof, the post formation carrying at the end remote from the thread formation a fixed member 48 having a part spherical configuration which is insertable within the end of the tubular member 49, the rotatable post formation carrying inwardly of the part spherical element a cup-shaped collar 50 which presents a concave bearing surface 50a to the part spherical member 48 and constrains the end edge portion 51 of the tube 49 against the part spherical member 48 whereby lateral shifting of the tube 49 can be accomplished.

The rotatable shaft formation 46 as in the case of the embodiment B has a non-circular or squared cross section indicated at 52 in the region of the bearing operator element 53, the bore 54 of the bearing operator element likewise having a corresponding configuration to accommodate shifting of the bearing operator element as well as enabling imparting of rotational movement to the rotatable post.

As in the case of the embodiment B, the bearing operator element 53 presents bearing surfaces 55a, 55b to the end surface 56 of the collar and to the connector 57 with the tube end in gripped relation and with the threaded end 47 inserted in the tapped opening 59 of the connector 60.

In order that the bearing operator element be positioned in the region of the non-circular configuration of the rotatable post formation, a nut formation 58 or any other suitable means is provided to prevent axial shifting beyond that region.

In FIGURE 6 a spacer element or washer is indicated at 61. In certain circumstances it may be necessary to employ such spacer elements to gain the pressure required to hold the tubular member 49 in tight engagement with the connector 60, that is, to ensure that the bearing operator element spans the distance between the collar 50 and the surface of the connector 60.

As in the case of embodiments A and B it may be necessary to adjust the position of the part spherical member 48 and the operator element 53 to achieve the tight engagement desired.

It will be appreciated that persons skilled in the art may make variations or modifications in the embodiments illustrated and described without departing from the spirit and the scope of the invention as defined in the appended claims.

What I claim is:

1. A coupling for joining a tubular member to a structural element presenting a tapped opening to the surface thereof comprising a split sleeve formation including a split sleeve portion insertable into the end of a selected tubular member and a ring-like base portion adapted to seat up against the end edge of a selected tubular member, a shank formation having a first thread formation thereon extending inwardly from one end for threadably engaging in a tapped opening in a selected structural element, said shank formation extending axially of said split sleeve formation and having a second thread formation extending inwardly from the opposite end thereof in the region of said split sleeve portion and of opposite hand to said first-mentioned thread formation, said shank formation carrying means for expanding said split sleeve portion in the region of said split sleeve portion and threadbly engaging same for displacement along the shank formation upon rotation of same, bearing means carried by said shank formation inwardly of the end from which the first-mentioned thread formation extends said bearing means being operatively connected to said shank formation to impart rotational movement thereto whereby said shank formation is threadably engaged in the tapped opening of the selected structural element and said split sleeve portion is expanded against the inner wall of the selected tubular member, said bearing means having an axial extent of the order to bear against the surfaces of said ring-like base portion and the selected structural element with said split sleeve portion expanded against the inner wall of the selected tubular member and the shank formation threadably engaged in the tapped hole of the selected structural element.

2. A coupling for joining a tubular member to a structural member which tubular member has a first end of reduced diameter and which structural element has a tapped hole therein, said coupling comprising a tube-engaging member adapted to be disposed within said tubular member, said tube-engaging member having a spherical surface adapted to project beyond the said first end, a collar having a concave surface adapted to engaged said first end of said tubular member, a post secured to said tube-engaging member and projecting from said spherical surface through said collar, said post having a threaded end remote from said tube-engaging member adapted to engage said tapped hole, and bearing operator means operably connected to said post impart rotational movement to said post to effect engagement between structural member and said tubular member.

3. A coupling as claimed in claim 2 wherein said post includes a squared section and extends through a passage in said bearing operator means, said passage having a configuration conforming with said squared section of said post.

4. A coupling as claimed in claim 2 including means adapted to limit axial movement between said squared section of said post and said bearing operator means.

5. A coupling as claimed in claim 2 in which said post includes a squared section, and extends through a passage in said bearing operator means, said passage having a configuration conforming with said squared section of said post, said bearing operator means having an axial extent adapted to hold said collar in engagement with said tube-engaging member and said structural member.

6. A coupling as claimed in claim 5 including spacer means interposed between said bearing operator means and said collar.

References Cited in the file of this patent

UNITED STATES PATENTS

| | | |
|---|---|---|
| 2,496,032 | Austin | Jan. 31, 1950 |
| 3,051,517 | Yalen | Aug. 28, 1962 |

FOREIGN PATENTS

| | | |
|---|---|---|
| 591,253 | Great Britain | Aug. 12, 1947 |